May 21, 1963  J. T. RENSCH  3,090,527
TRUCK MOUNTED HOPPER
Filed April 13, 1959
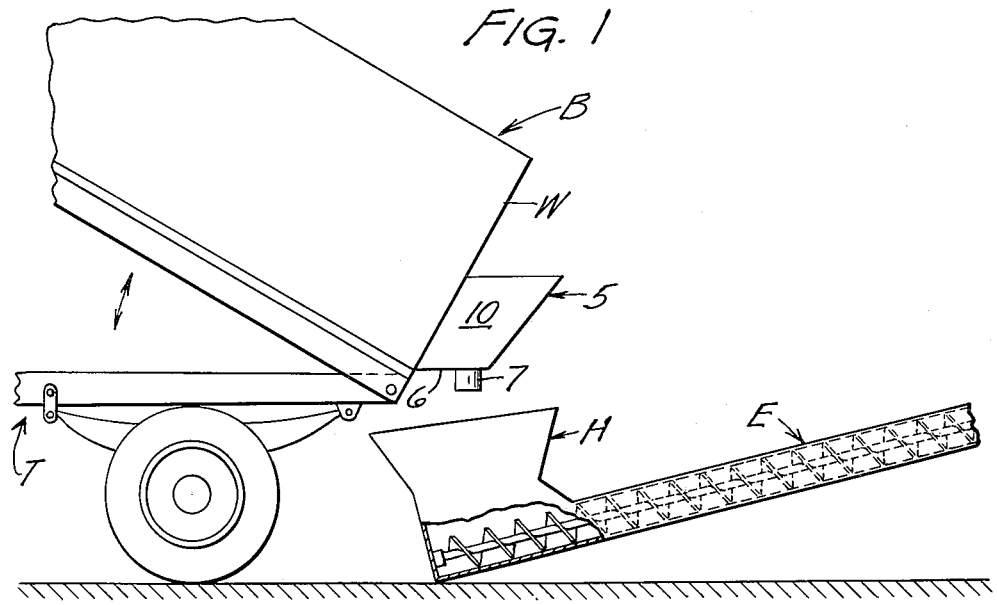
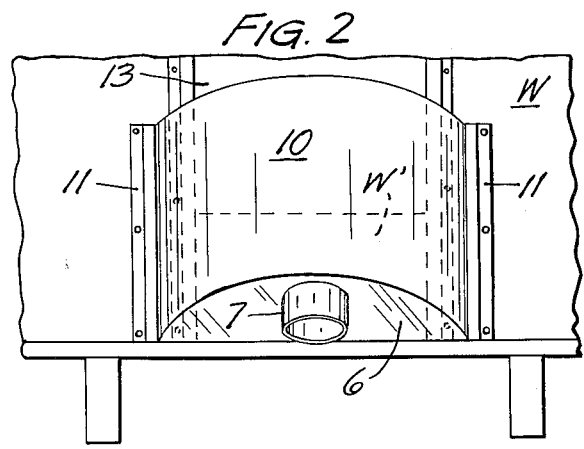
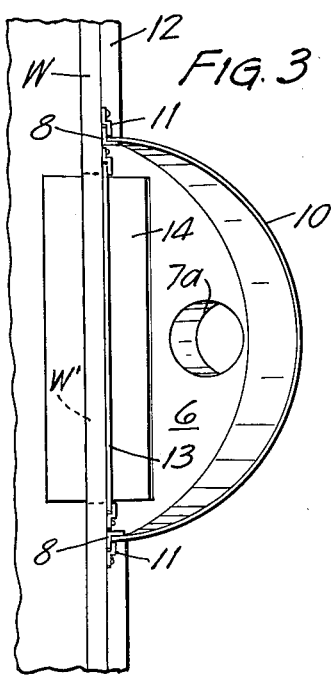
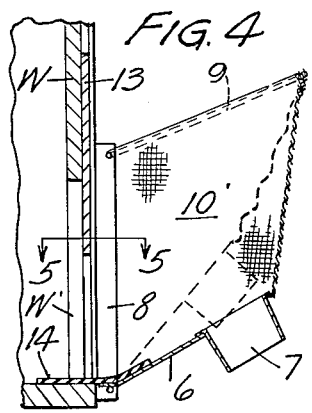
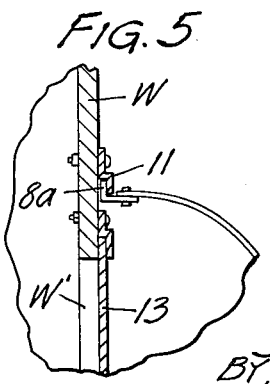
INVENTOR
JOSEPH T. RENSCH
BY Williamson, Schroeder & Palmatier
ATTORNEYS

United States Patent Office 3,090,527
Patented May 21, 1963

3,090,527
TRUCK MOUNTED HOPPER
Joseph T. Rensch, Makoti, N. Dak.
Filed Apr. 13, 1959, Ser. No. 805,857
1 Claim. (Cl. 222—176)

This invention relates to delivery mechanisms and in particular to delivery hoppers for transferring fluent granular material from dump trucks, storage bins and the like.

An object of this invention is a novel hopper or delivery chute of simple design, construction and operation which is readily adapted to, and detachably mountable on, existing enclosure structures such as dump trucks and storage bins having sliding gates in the walls thereof.

Another object is a detachable hopper which prevents spillage of granular material on the ground and area surrounding the storage structure and delivery chute or hopper.

Still another object is a hopper of the class described which is yielding in nature so as to prevent damage to the hopper and truck when the box of the truck is tilted or lowered to the point where contact is made with the ground or with some other obstruction which might press upwardly against the hopper and the truck.

Still another object is a hopper of the class described which permits neat, clean uncontaminated transfer of granular material from a truck or bin to an elevating or conveying mechanism.

A still further object is a hopper of the class described which permits direct delivery of the granular material from the storage medium to the conveying or delivery mechanism without contamination, waste or the necessity of cleaning up afterwards.

Still another object is a detachable hopper which is readily mounted adjacent the delivery gate of a dump truck or storage bin while permitting the gate to remain closed until ready for unloading, and then permits easy access to the gate to open same to permit unloading of the truck or bin.

Still another object is a detachable hopper of the class described which may be used solely by itself as the delivery mechanism or in conjunction or combination with a rigid or flexible chute element which is readily attachable thereto.

A still further object is a hopper of the class described which is so designed as to direct substantially all of the granular material entering said hopper to the discharge spout regardless of the angle to which the box is titled.

A further object is a detachable hopper of the class described which will, when mounted on the box of a dump truck, consistently deliver the material passing therethrough downwardly and/or away from said truck.

These and other objects and advantages of my invention will more fully appear from the following description made in connection with the accompanying drawings, wherein like reference characters refer to the same or similar views, and in which:

FIG. 1 shows the hopper of my invention in side elevation and in assembled and operating relationship with a dump truck and an elevating device
FIG. 2 is a front elevational view;
FIG. 3 is a top plan view;
FIG. 4 is a side view in vertical section of still another form of my invention; and
FIG. 5 is a fragmentary horizontal section taken on the line 5—5 of FIG. 4.

Referring to the drawings which show preferred embodiments of my invention, and particularly to the form shown in FIGS. 1-3 and 5, the hopper of my invention indicated generally by the number 5 has an upwardly inclined (when truck box is lowered) bottom plate 6 of generally semi-circular configuration as viewed from the top, said bottom plate 6 having mounted thereon a downwardly extending discharge spout 7 which is in direct flow communication with the interior of the hopper by means of a suitable opening 7a in the bottom plate, which opening is disposed preferably adjacent the marginal edge of the bottom plate at a point directly opposite to the discharge opening of the enclosure upon which the hopper is mounted.

A pair of vertical supporting members such as the angle irons 8 are provided which serve not only to support the hopper but also are the means of attaching the hopper of my invention to the tail gate of the truck or the side wall of the storage bin. These vertical supporting members are attached to the bottom plate 6 and extend upwardly therefrom to define the back or rear marginal edge of the hopper. The radially extending legs 8a of the supporting members 8 are adapted to be slidably and removably received in suitable ways carried by the material enclosure wall or endgate W hereinafter to be described.

The vertical supports may have attached thereto a semi-circular generally horizontally disposed side wall supporting top frame 9 as shown in the embodiment of FIG. 4. This is particularly desirable where the side wall of the hopper is made of strong flexible or collapsible material such as canvas, which is within the contemplation of the invention and shown in FIG. 4.

An arcuate wall 10 serves to enclose the hopper and is mounted on and supported by the vertical supports 8 and the bottom plate 6, the juncture of the wall 10 and bottom plate 6 being sealed to prevent leakage of the fluent material therebetween. The arcuate wall 10 may be of rigid construction as of sheet metal or it may be flexible in nature as when made of a strong flexible collapsible material such as canvas, as is the wall 10' shown in FIG. 4.

As shown in the drawings, the hopper of my invention is adapted for detachable mounting on a supporting enclosure such as the tailgate W of a truck having a discharge opening W' provided therein and a sliding gate member 13 for closing and opening said discharge opening W'. To permit readily detachable mounting and removal of the hopper of my invention on the tailgate, the tailgate is provided with a pair of elongate vertically extending guide members 11 of generally S-shaped cross section which define a way or track between the guide members 11 and the tailgate, each way or track being adapted to receive the outwardly extending flange or leg 8a of the vertical support 8 of the hopper to permit detachable sliding cooperative guided engagement between the vertical support members of the hopper and the S-shaped guide track members 11 mounted on the tailgate. The downward displacement of the hopper being limited by the truck box floor 12 or by any other suitable rest or abutment surface.

In one preferred form of my invention, as previously mentioned, the side wall of my hopper is of flexible material such as canvas as shown in FIG. 4 by numeral 10'. In such circumstances, the bottom plate 6 is preferably hingedly mounted to the vertical support members 8 as shown at 13 so that the bottom plate 6 will yield under upwardly directed pressure while still continuing to operate successfully.

The spout 7 may be used independently as the means for delivering the granular material directly from the hopper of my invention to the material receiving hopper H carried by the receiving member such as the elevating unit E shown or the spout may have mounted thereon an elongate flexible or rigid chute (not shown). It should be noted that when the hopper is viewed from the side, the bottom plate 6 is inclined upwardly from the horizontal so as to always be inclined at an angle of less than 90 degrees from the vertical supporting members 8. This angle is preferably of sufficient degree that the bottom plate 6 will never be tilted below the horizontal plane regardless of how high the truck box is hoisted. The primary purpose of this inclination is to insure that the spout 7 will always be directed generally downwardly and forwardly rather than towards the rear or under the truck which would present difficulties in unloading when the box of the truck is tilted. It is, of course, intended that the guide track members 11 will be permanently mounted on either side of the gate of the dump truck or storage bin so that the hopper of my invention may be readily attached or dismounted as desired.

To prevent the granular material from leaking or spilling out from between the hopper and supporting wall W, a flap or skirt 14 is provided which overlaps the juncture between the tailgate and the back end of the hopper and directs all of the granular material escaping through the discharge opening of the truck directly into the hopper and prevents any such material from coming in contact with the space between the tailgate and the hopper. The hopper is readily adapted for use with a plurality of gate openings provided, of course, that it is wide enough to span all of the openings should they be of different sizes. All that is necessary is that suitable guide track members be provided on each of the structures with which it is to be mounted and a single hopper can then be used on any and all of these various structures. Thus, a single hopper will service a plurality of fluent material enclosures.

From the foregoing description, the advantages of my invention are readily apparent. The hopper is of a design which is easy and inexpensive to make, is light in weight, and is simplicity itself to operate, and is readily attachable and detachable from the storage bin or tailgate of the truck. When it is desired to unload a truck or bin, all that is necessary is that the hopper be positioned adjacent the discharge opening of the tailgate by suitably sliding the hopper into cooperative engagement with the guide track members disposed at either side of said opening. The sliding gate of the tailgate is then simply raised to open the discharge opening and expose the contents of the box to the hopper. A receiving device such as an elevator or conveyor is strategically disposed beneath the spout of the hopper and receives the granular material directly therefrom. As indicated, if desired, a rigid or flexible chute may be attached to the spout of the hopper to facilitate and direct the granular material directly to the conveying or elevating mechanism. If, in the tilting of the box of a dump truck, the hopper is lowered to the point where it or a chute mounted thereon makes contact with the receptacle, the yielding nature of one of the preferred forms of my invention previously described permits the bottom to yield and raise itself easily upon meeting such resistance without damage to the hopper or to the truck while permitting the discharging of the granular material to continue from the box of the truck through the hopper mechanism.

It will, of course, be understood that various changes may be made in the form, details, arrangement and proportions of the various parts without departing from the scope of my invention.

What I claim is:

In combination, a dump truck having an end gate with a material discharge opening therein and gate means for opening and closing same, a separate hopper which includes side frame structure defining a material inlet opening in the side of said hopper, top frame structure connected to said side frame structure and extending outwardly therefrom, a bottom portion having a material outlet opening therein, said bottom portion being hingedly connected to said side frame structure for free swinging movement towards said inlet opening, and side wall structure made of collapsible material extending between and connected to said top frame and said bottom portion, and means for mounting said hopper on said end gate comprising guide means mounted on said end gate on both sides of said discharge opening providing vertically disposed guide slots, and tongue means carried by said side frame structure and adapted for insertion into said slots for free sliding cooperative engagement therewith, and stop means for limiting the downward movement of said tongue means whereby said hopper is normally retained in an operative position in which the inlet opening thereof is opposed to and in flow communication with the discharge opening of said end gate and wherein said tongue means are free to slide upwardly if said hopper is pushed from below.

References Cited in the file of this patent

UNITED STATES PATENTS

| | | |
|---|---|---|
| 267,370 | Raynor et al. | Nov. 14, 1882 |
| 1,204,274 | Howard | Nov. 7, 1916 |
| 1,208,445 | Arnold | Dec. 12, 1916 |
| 1,735,930 | Miller | Nov. 19, 1929 |
| 1,806,363 | Narbo | May 19, 1931 |
| 2,152,259 | Humphrey | Mar. 28, 1939 |
| 2,222,083 | Lintz | Nov. 19, 1940 |
| 2,670,108 | Skogstad et al. | Feb. 23, 1954 |
| 2,684,183 | Werner | July 20, 1954 |
| 2,766,991 | Burghardt | Oct. 16, 1956 |